Dec. 7, 1965 T. R. HENRY 3,221,969
APPARATUS FOR FABRICATING A PIECE PART HAVING
A METALLIC BIT SECURED THERETO
Filed Oct. 16, 1963 2 Sheets-Sheet 1

INVENTOR.
T. R. HENRY
BY
S. Gundersen
ATTORNEY 3,221,969
APPARATUS FOR FABRICATING A PIECE PART HAVING A METALLIC BIT SECURED THERETO
Thomas R. Henry, Columbus, Ohio, assignor to Western Electric Company, Incorporated, New York, N.Y., a corporation of New York
Filed Oct. 16, 1963, Ser. No. 316,554
2 Claims. (Cl. 228—18)

This invention relates to securing the end of a metal tape with a piece part and particularly relates to the utilization of the piece part as a shearing member to shear the secured end of the tape from the tape supply.

In the manufacture of various types of electrical equipment such as switches and relay contacts, it is necessary to assemble and secure metal contact bits with a supporting piece part. Such products are generally fabricated by positioning the free end of a contact tape supply adjacent the piece part, thereafter welding the end of the tape supply to the piece part end and operating a separate shearing means for shearing the portion of the tape secured with the piece part from the remaining tape supply. By utilizing this shearing approach, a shearing means is required wherein portions of the tape supply are destroyed during the shearing operation due to the thickness of the shearing blades and further presents a problem of not shearing the secured portion of the tape evenly with the piece part.

It is, therefore, an object of this invention to fabricate a piece part having a bit of metallic tape secured thereto.

Another object of this invention is to shear a portion of contact tape secured with a piece part form the remaining portion of the tape.

With these and other objects in view, the present invention contemplates moving relatively a shear blade and a piece part with the end of a metallic tape secured thereto so that the piece part cooperates with the shear blade to shear the secured portion of the tape from the remaining portion of the tape supply.

In addition, the piece part is supported prior to the shearing operation to facilitate welding of the end of the metal tape thereto.

Figure 1:
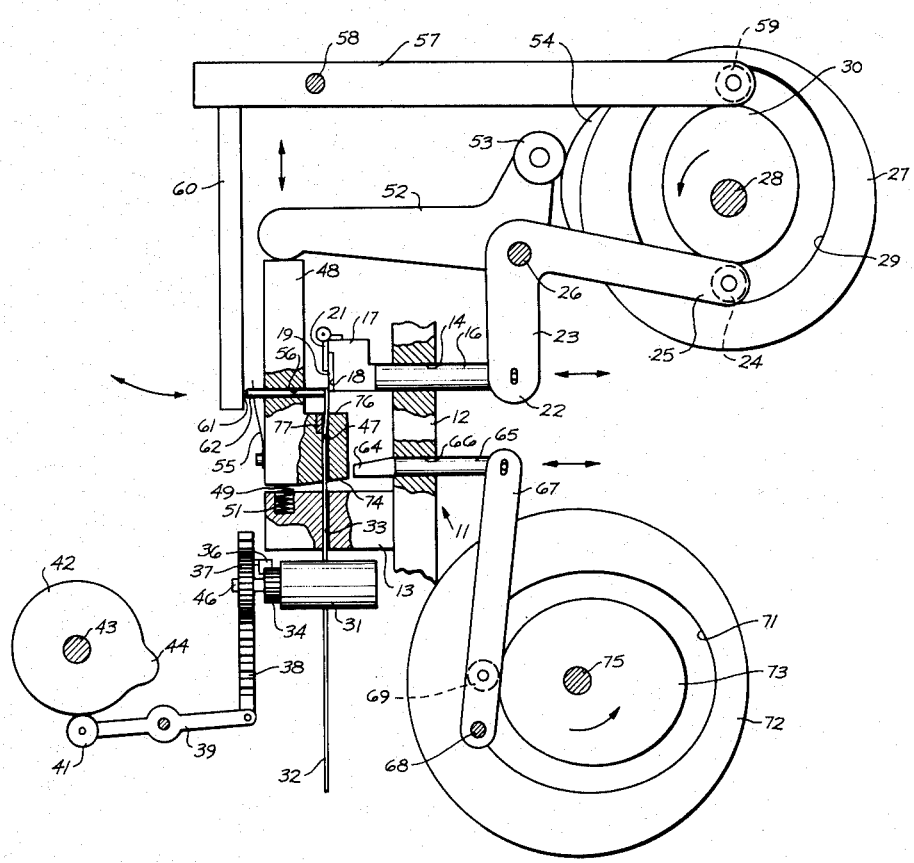

Other objects and advantages of the invention will be more readily understood from the following detailed description of apparatus from a specific embodiment thereof when read in conjunction with the appended drawings, in which:

FIG. 1 is a front view showing cam-controlled apparatus for securing the free end of a contact tape with a piece part and thereafter shearing the secured portion of the tape from the remaining portion of the tape, and FIGS. 2 through 5 show diagrammatical views revealing step-by-step securing and shearing operations accomplished by the apparatus of FIG. 1.

Referring to FIG. 1, a portion of a frame 11 is shown having a vertical stand 12 with a horizontal support 13 extending therefrom. The vertical stand 12 is formed with a first aperture 14 for slideably supporting a reciprocable rod 16. One end of the rod 16 is formed with a piece part support 17 having a nest 18 for receiving and supporting a flat metallic piece part 19. A plurality of pins 20 (FIG. 2) extend from the nest 18 for receiving a corresponding plurality of apertures formed in the piece part 19 to align and support the piece part in the nest. In addition, a spring-biased clamp 21 is attached to the support 17 and holds the piece part 19 within the nest 18. The opposite end of the rod 16 is secured to one end 22 of a bell crank 23 which supports a cam follower 24 at the opposite end 25 thereof. The bell crank 22 is pivotally secured to a fixed rod 26 intermediate the ends thereof wherein the rod is fixedly secured to the frame 11. A barrel cam 27, which is rotated by a driving system (not shown), is secured to a shaft 28 rotatably mounted in the frame 11. The cam 27 is formed with a cam groove 29 which receives and guides the cam follower 23 therein. As the cam 27 is rotated, a camming portion 30, which is contiguous with the groove 29, engages the cam follower 23 to pivot the bell crank 22 about the fixed rod 26, thereby providing reciprocatory motion for the rod 16 and, hence, the piece part 19.

Referring further to FIG. 1, a feed roller 31 and an opposed idler roller (not shown) feed and guide a supply of metallic contact tape 32 through a guide slot 33 formed in the horizontal support 13 where the slot is slightly larger than the tape to facilitate free movement of the tape within the slot. The feed roller 31 is provided with a circular ratchet 34 which is driven by a spring-biased pawl 36 secured to a pinion 37. A rack 38 is secured to one end of a lever 39 which is pivotally secured intermediate the ends thereof to a rod 40 attached to the frame 11 and is further provided with a cam follower 41 at the opposite end thereof. The cam follower 41 is positioned in engagement with the outer edge of a cam 42 mounted for rotation on a shaft 43 rotatably supported in the frame 11 where the cam outer edge is formed with a cam lobe 44 for periodically engaging the cam follower 41. In this manner, the lever 39 is periodically pivoted to vertically reciprocate the rack 38, thereby rotating the pinion 37. As the rack 38 is raised, the pinion 37 is rotated to engage the pawl 36 with the ratchet 34, thereby rotating the feed wheel 31 so that the tape 32 is fed upwardly. As the rack 38 is lowered, the pawl 36 backs over the serrations of the ratchet 38 whereby the tape 32 is held in a fixed position during the reverse movement of the track. It is noted that the feed roller 31 having the ratchet 34 secured thereto is secured to a shaft 46 rotatably supported by the frame 11. In addition, the pinion 37 is freely supported by the shaft 46 for free rotation thereabout. As the feed roller 31 is rotated to feed the tape 32 upwardly, the tape passes through the slot 33 of the horizontal support 13 and is further urged through a slot 47 of an L-shaped shear support 48 which is slideably mounted within the frame 11 and resiliently supported atop the horizontal support 13 by a compression spring 49 positioned within an aperture 51 formed in the horizontal support. The tape 32 is urged upwardly until the leading end of the tape is positioned adjacent the lower end of the metallic piece part 19, as shown in FIG. 1. Thereafter, the cam lobe 44 moves away from the cam follower 41 whereby the ratchet 38 is moved downwardly. However, as previously described, the spring-biased pawl 36 is urged backwardly over the serrations of the ratchet 34 so that the feed wheel 31 is not rotated, thereby maintaining the leading end of the contact tape 32 in juxtaposition with the piece part 19.

A bell crank 52 is secured to the rod 26 for rotation thereabout and is provided with a cam follower 53 at one end thereof positioned for engagement with a cam lobe 54 formed on the periphery of the barrel cam 27. The opposite end of the bell crank 52 is positioned in engagement with the upper surface of the L-shaped shear support 48 to urge the support downwardly against the biasing action of the spring 49 when the cam follower 53 engages the cam lobe 54. In this manner, a welding tip 62 positioned in an aperture 56 formed in the L-shaped shear support 48 and normally biased away from the piece part 19 by a flat spring 55 is aligned with the leading end of the tape 32 and the lower edge of the piece part 19. A rocker arm 57 is pivotally secured to a fixed rod 58 which is mounted in the frame 11. One end of the arm 57 is provided with a cam follower 59 which rides in the groove 29 of the barrel cam 27. The opposite end of the arm 57 is provided with a downwardly extending support 60 for carrying a welding contact 61 thereon. As the cam follower 59 engages the camming portion 30 of the barrel cam 27, the rocker arm 57 is pivoted so that the welding contact 61 engages and urges the welding tip 62 against the biasing action of the spring 55 through the aperture 56 of the shear support 48 and into engagement with the leading end of the tape 32 whereby the tape end is pressed into engagement with the piece part 19. Thereafter, a welding circuit (not shown), which is connected between the piece part 19 and the contact 61, is actuated to weld the leading end of the tape 32 with the lower edge of the piece part 19. Subsequent to the welding operation, the camming portion 30 of the barrel cam 27 is moved away from the cam follower 59 whereby the rocker arm 57 is pivoted to remove the welding contact 61 from engagement with the tip 62 so that the tip is returned to a normal rest position by the biasing action of the spring 55 within the aperture 56 of the shearing support 48. Thereafter, the cam lobe 54 is moved from engagement with the cam follower 53 of the bell crank 52 so that the downward force applied to the opposite end of the bell crank is relieved whereby the shearing support 48 is urged upwardly by the biasing action of the spring 49. A wedge 64 is formed on one end of a slide 65 which is slideably positioned within an aperture 66 of the vertical stand 12 and is secured at the opposite end thereof to one end of a lever 67. The lever 67 is mounted for pivotal movement at the opposite end thereof about a rod 68 which is secured to the frame 11. A cam follower 69 is secured to an intermediate portion of the lever 67 and is positioned within a groove 71 of a barrel cam 72 mounted for rotation on a shaft 75 supported in the frame 11. As the cam 72 is rotated by the driving system (not shown), a camming portion 73 engages the cam follower 69 to pivot the lever 67, thereby providing reciprocatory motion for the slide 65 and the wedge 64. Subsequent to the welding of the leading end of the tape 32 with the piece part 19 and the upward movement of the shearing support 48, the wedge 64 is urged toward the shearing support and engages a beveled surface 74 formed on the underside of the shearing support, thereby urging a surface 76 of the support against the under surface of the piece part support 17 and the piece part 19. It is noted that the aperture 47 is of sufficient dimensions to allow free vertical movement of the shearing support 48 relative to the tape 32. In this manner, a shearing block 77 mounted in the support 48 is positioned diagonally on the opposite side of the tape 32 from the piece part 19, to define a shear plane between the shear block and the piece part which is perpendicular to the tape. Thereafter, the cam follower 23 of the bell crank 22 engages the camming portion 30 of the cam 27 to slide the rod 16 toward the aperture 56 of the shearing support 48. As the rod 16 is moved, the piece part 19 is moved toward the aperture 56 and cooperates with the shearing block 77 positioned within the shearing support 48 to shear the welded portion of the tape 32 from the remaining portion of the tape. In this manner, the piece part 19 is utilized as a shearing member, thereby eliminating the necessity of separate shearing elements to shear the welded end of the tape from the remaining portion of the tape. In addition, by utilizing the piece part 19 as a shearing member, an even shear is obtained whereby a minimum of tape material is displaced as compared with the displacement of tape material sheared by separate shearing apparatus.

Figure 2:
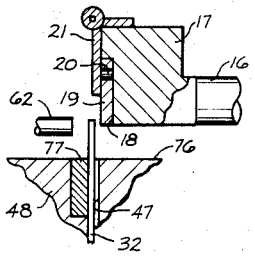
Figure 3:
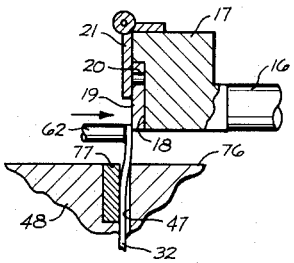
Figure 4:
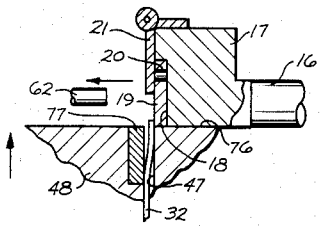
Figure 5:
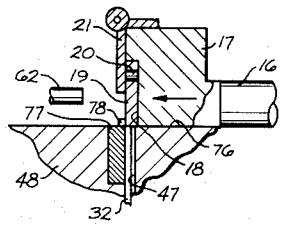

Referring now to FIG. 2, the leading end of the tape 32 is positioned within the aperture 47 of the shearing support 48 adjacent the lower edge of the piece part 19. In addition, the welding tip 62 is aligned with the leading end of the tape 32 and the lower edge of the piece part 19 for the subsequent welding operation. As shown in FIG. 3, the welding tip 62 is moved into pressing engagement with the leading end of the tape 32 to press the tape end against the piece part 19, whereafter the welding circuit (not shown) connected between the contact 61 (FIG. 1) and the piece part is actuated to weld the leading end of the tape to the piece part. Referring to FIG. 4, the welding tip 62 is removed subsequent to the welding operation and the shearing support 48 is raised so that the surface 76 engages the underside of the support 17 and the piece part 19. As shown in FIG. 5, the rod 16 is moved to the left, whereby the piece part 19 cooperates with the shearing block 77 to shear the leading end of the tape 32 from the remaining portion of the tape, thereby providing a metallic bit 78 welded to the piece part.

It is to be understood that the above-described arrangement is simply illustrative of the principles of the invention, other arrangements may be devised by those skilled in the art which will embody the principles of the invention and fall within the spirit and scope thereof.

What is claimed is:

1. Apparatus for securing the leading end of a metallic tape to a piece part and for shearing the secured portion of the tape from the remaining portion of the tape, which comprises:

means for movably supporting the piece part, means for securing the leading end of the tape to the supported piece part, means cooperating with the piece part upon movement of the piece part for shearing the portion of the tape secured to the piece part from the remaining portion of the tape, means for holding the shearing means spaced from the piece part during a period when the tape end is being secured to the piece part, means for removing the holding means from engagement with the shearing means when the tape end is secured to the piece part, means for moving the shearing means into cooperative shearing position with respect to the piece part to define a shear plane between the shearing means and the piece part, and means for moving the piece part supporting means along the shear plane and toward the shearing means so that the piece part cooperates with the shearing means to shear the secured tape end from the remaining portion of the tape.

2. Apparatus for securing the leading end of a metallic tape to a piece part and for shearing the secured portion of the tape from the remaining portion of the tape, which comprises:

a frame, a first slide mounted for reciprocable movement within the frame, a nest formed in the first slide for supporting the piece part therein, a second slide mounted for reciprocable movement within the frame in a direction perpendicular to the direction of movement of the first slide, the second slide formed with a first aperture perpendicularly disposed to the first slide for the passage of the leading end of the metallic tape therethrough, means for feeding the tape through the first aperture of the second slide and for positioning spacially the leading end adjacent the piece part secured within the nest of the first slide, the second side formed with a second aperture substantially in line with the direction of movement of the first slide, a welding tip positioned slideably within the second aperture of the second slide, means for moving the welding tip into engagement with one surface of the leading end of the tape subsequent to the spacial positioning of the tape adjacent the piece part and for moving the welding tip with the tape so that the opposite surface of the tape is moved into engagement with the piece part, whereby the tape end is secured to the piece part, means for moving the second slide toward the first support so that the first aperture of the support is guided loosely over the leading end of the tape with only the secured end of the tape being exposed, a shear block supported in the second slide contiguous with the first aperture of the second slide and diagonally opposite the piece part, whereby a shear plane is defined between the shear block and the piece part, and means for moving the piece part along the shear plane so that the piece part and the shear block cooperate to shear the secured portion of the tape from the remaining portion of the tape.

References Cited by the Examiner

UNITED STATES PATENTS

| | | | |
|---|---|---|---|
| 1,760,507 | 5/1930 | Loebe et al. | 113—123 |
| 1,907,931 | 5/1933 | Henderson | 29—155.55 |
| 1,907,932 | 5/1933 | Pugh | 29—155.55 |
| 2,307,579 | 1/1943 | Fluke | 29—155.55 X |
| 2,388,754 | 11/1945 | Martindell | 219—79 |
| 2,643,446 | 6/1953 | Matthysse et al. | 113—123 |

FOREIGN PATENTS 523,455   7/1940   Great Britain.

WHITMORE A. WILTZ, *Primary Examiner.*

JOHN F. CAMPBELL, *Examiner.*